(12) United States Patent
Galigekere et al.

(10) Patent No.: US 9,196,047 B2
(45) Date of Patent: Nov. 24, 2015

(54) AUTOMATED TUBERCULOSIS SCREENING

(75) Inventors: Ramesh R. Galigekere, Manipal (IN); Rohit Nayak, Orissa (IN); Vishnu Prasad, Udupi (IN)

(73) Assignee: MANIPAL INSTITUTE OF TECHNOLOGY, Karnataka (IN)

( * ) Notice: Subject to any disclaimer, the term of this patent is extended or adjusted under 35 U.S.C. 154(b) by 388 days.

(21) Appl. No.: 13/375,135

(22) PCT Filed: Dec. 23, 2010

(86) PCT No.: PCT/IB2010/056049
§ 371 (c)(1),
(2), (4) Date: Nov. 29, 2011

(87) PCT Pub. No.: WO2012/063107
PCT Pub. Date: May 18, 2012

(65) Prior Publication Data
US 2012/0177279 A1     Jul. 12, 2012

(30) Foreign Application Priority Data
Nov. 8, 2010 (IN) .......................... 3324/CHE/2010

(51) Int. Cl.
*G06K 9/00* (2006.01)
*G06T 7/00* (2006.01)

(52) U.S. Cl.
CPC ............ *G06T 7/0081* (2013.01); *G06T 7/0012* (2013.01); *G06T 2207/10056* (2013.01); *G06T 2207/20036* (2013.01); *G06T 2207/20141* (2013.01); *G06T 2207/30004* (2013.01)

(58) Field of Classification Search
CPC ................................................... G06T 7/0012
USPC ........................................................... 382/134
See application file for complete search history.

(56) References Cited

U.S. PATENT DOCUMENTS

| | | | |
|---|---|---|---|
| 5,671,290 A * | 9/1997 | Vaidyanathan | 382/133 |
| 6,141,464 A * | 10/2000 | Handley | 382/287 |
| 6,215,892 B1 * | 4/2001 | Douglass et al. | 382/128 |
| 6,363,162 B1 * | 3/2002 | Moed et al. | 382/112 |
| 6,438,261 B1 * | 8/2002 | Moshe et al. | 382/133 |
| 6,870,549 B1 * | 3/2005 | Swann et al. | 345/636 |
| 6,922,485 B2 * | 7/2005 | Hirata | 382/164 |
| 7,171,036 B1 * | 1/2007 | Liu et al. | 382/145 |

(Continued)

OTHER PUBLICATIONS

Nayak, R. et al. "A New Algorithm for Automatic Assessment of the Degree of TB-infection Using Images of ZN-stained Sputum Smear", Proceedings of 2010 International Conference on Systems in Medicine and Biology, Dec. 16, 2010, p. 1-6.*

(Continued)

*Primary Examiner* — Gandhi Thirugnanam
(74) *Attorney, Agent, or Firm* — Foley & Lardner LLP

(57) ABSTRACT

A method, system, and computer-readable medium for determining a number of mycobacteria in source image data of a sputum-smear sample are provided. First image data is extracted from the source image data of the sputum-smear sample. Binary image data is created from the extracted first image data. A plurality of groups of blobs is identified in the created binary image data. A distance between a pair of the identified plurality of groups of blobs is determined. If the distance is below a threshold value, the pair is combined as a single group of blobs. The determining is repeated for pairs of the identified plurality of groups of blobs, and the remaining groups of blobs are then classified.

25 Claims, 7 Drawing Sheets

(56) References Cited

U.S. PATENT DOCUMENTS

| | | | |
|---|---|---|---|
| 7,616,790 B2* | 11/2009 | Petrou et al. | 382/128 |
| 7,646,905 B2* | 1/2010 | Guittet et al. | 382/133 |
| 8,180,129 B2* | 5/2012 | Goetz et al. | 382/128 |
| 2002/0110269 A1* | 8/2002 | Floeder et al. | 382/141 |
| 2002/0146166 A1* | 10/2002 | Rao et al. | 382/164 |
| 2003/0108237 A1* | 6/2003 | Hirata | 382/164 |
| 2003/0113004 A1* | 6/2003 | Kim et al. | 382/128 |
| 2003/0174907 A1* | 9/2003 | Kanemoto et al. | 382/309 |
| 2005/0163373 A1* | 7/2005 | Lee et al. | 382/173 |
| 2006/0014137 A1* | 1/2006 | Ghosh et al. | 435/4 |
| 2006/0098858 A1* | 5/2006 | Guittet | 382/133 |
| 2006/0127881 A1* | 6/2006 | Wong et al. | 435/4 |
| 2006/0211071 A1* | 9/2006 | Andre et al. | 435/13 |
| 2006/0228044 A1* | 10/2006 | Yeh et al. | 382/276 |
| 2007/0206233 A1* | 9/2007 | Koyama et al. | 358/462 |
| 2008/0181482 A1* | 7/2008 | Bouchard et al. | 382/133 |
| 2008/0199948 A1* | 8/2008 | Tafas et al. | 435/288.7 |
| 2008/0267471 A1* | 10/2008 | Yu et al. | 382/128 |
| 2009/0202108 A1* | 8/2009 | Faeldt et al. | 382/103 |
| 2010/0111379 A1* | 5/2010 | Suri et al. | 382/128 |
| 2010/0119113 A1* | 5/2010 | Kuleschow et al. | 382/103 |
| 2010/0172568 A1* | 7/2010 | Malon et al. | 382/133 |
| 2010/0266175 A1* | 10/2010 | Seung et al. | 382/128 |
| 2011/0317904 A1* | 12/2011 | Zhu et al. | 382/133 |
| 2012/0177279 A1* | 7/2012 | Galigekere et al. | 382/133 |
| 2012/0275646 A1* | 11/2012 | Drouin et al. | 382/103 |
| 2013/0279789 A1* | 10/2013 | Elter et al. | 382/134 |
| 2014/0126802 A1* | 5/2014 | Adiga et al. | 382/133 |

OTHER PUBLICATIONS

R. Fisher, S. Perkins, A. Walker and E. Wolfart, "Dilation", 2003, http://homepages.inf.ed.ac.uk/rbf/HIPR2/dilate.htm.*

Author Unknown, "Morphological Operators", Feb. 2012, "http://www.coe.utah.edu/~cs4640/slides/Lecture11.pdf".*

Nayak, R. et al., "A New Algorithm for Automatic Assessment of the Degree of TB-infection Using Images of Zn-stained Sputum Smear", Dec. 2010, Proceedings of 2010 International Conference on Systems in Medicine and Biology, p. 1-6.*

Osman M.K. et al., "Segmentation of Tuberculosis Bacilli in Ziehl-Neelsen-Stained Tissue Images based on K-Mean Clustering Procedure", Mathematical/Analytical Modelling and Computer Simulation (AMS), 2010 Fourth Asia International Conference on, May 28, 2010, p. 1-6.*

Osman, Mk. et al "Colour Image Segmentation of Tuberculosis Bacilli in Ziehl-Neelsen-Stained Tissue Images using Moving K-Mean Clustering Procedure", 2010, 2010 Fourth Asia International Conference on Mathematical/Analytical Modelling and Computer Simulation, p. 215-220.*

Lenseigne, B. et al. "Support Vector Machines for Automatic Detection of Tuberculosis Bacteria in Confocal Microscopy Images", Apr. 2007, Biomedical Imaging: From Nano to Macro, 2007. ISBI 2007. 4th IEEE International Symposium on, p. 85-88.*

Tadrous, P. "Computer-Assisted Screening of Ziehl-Neelsen-Stained Tissue for Mycobacteria", 2010, American Journal of Clinical Pathology,p. 849-858.*

Forero-Vargas M. et al., "Segmentation, autofocusing and signature extraction of tuberculosis sputum images", 2002, Photonic Devices and Algorithms for Computing, vol. 4788, p. 171-182.*

Veropoulos, K. et al., "The Automated Identification of Tubercle Bacilli Using Image Processing and Neural Computing Techniques," Proc. $8^{th}$ Int. Conf. Artificial Neural Networks, Sep. 1998, pp. 797-802.

Veropoulos, K. et al. , "Image Processing and Neural Computing Used in the Diagnosis of Tuberculosis," Proc. Colloqium on Intelligent Methods in Healthcare and Medical Applications, Digest No. 98/54, Smith & Nephew Research Center, New York Control Division, IEE, Oct. 1998.

Forero, M.G. et al., "Identification of Tuberculosis Bacteria Based on Shape and Color," RealTime Imaging, vol. 10, 2004, pp. 251-262.

Sadaphal, P. et al., "Image Processing Techniques for Identifying Mycobacteium Tuberculosis in Ziehl Neelsen Stains," Int J. Tuberc Lung Dis 12(5):579-582, Jan. 2008, pp. 579-582.

Khutlang R., et al., "Classification of Mycobacterium Tuberculosis in Images of ZN-Stained Smears," first revision of IEEE Trans. Technology and Biomedicine, 2009.

Sahoo, P.K. and Aurora, G. "A Thresholding Method Based on Two-Dimensional Renyi's Entropy," Pattern Recognition, vol. 37, pp. 1149-1161, 2004.

González, R. C. et al., "Digital Image Processing Using Matlab," Pearson Education Inc. and Dorling Kindersley (India) Pvt. Ltd., Delhi, 2004.

Yakov, T. and Marcoulides, G.A., "An Introduction to Applied Multivariate Analysis," Routledge Taylor and Francis Group, New York, 2008.

Nayak, R. et al. , "Towards a Comprehensive Assessment of Wound Composition Using Color Image Processing," Proc. ICIP '09, Nov. 7-11, Cairo Egypt, 2009.

Sahoo P.K. et al., "A Survey of the Thresholding Techniques," Computer Vision Graphics Image Process., vol. 41, 233-260, 1988.

Jain, A. K. "Fundamentals of Digital Image Processing," Prentice-Hall, Englewood Cliffs, New Jersey 1989.

Makkapati, V. et al., "Segmentation and Classification of Tuberculosis Bacilli from ZN-Stained Sputum Smear Images," 5th Annual IEEE Conference on Automation Science and Engineering, Bangalore India, Aug. 22-25, 2009.

"Manual for Sputum Smear Fluorescence Microscopy," Revised National Tuberculosis Control Programme, Central TB Division, Directorate General of Health Services, New Delhi, India, (no date available).

Nayak, Rohit et al., "Automatic Assessment of the Degree of TB-Infection Using Images of ZN Stained Sputum Smear," Assessment Poster, Manipal University, Manipal, Karnataka, India, (no date available).

International Search Report and Written Opinion for PCT Application No. PCT/IB2010/056049, issued Apr. 27, 2011.

Marks S., "Evidence-Statement: Tuberculosis (Screening)," A Purchaser's Guide to Clinical Preventive Services: Moving Science into Coverage, National Business Group on Health, 2006 (9 pages), accessed at http://www.businessgrouphealth.org/benefitstopics/topics/purchasers/condition_specific/evidencestatements/tuberculosis_es.pdf.

World Health Organization, "Global Tuberculosis Control: Surveillance, Planning, Financing," WHO Report 2007, 277 pages.

\* cited by examiner

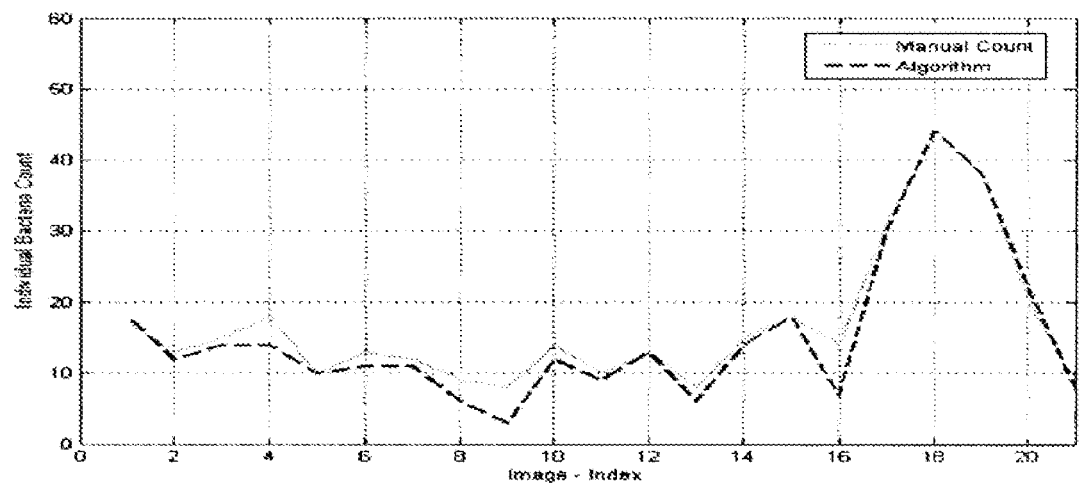
Fig. 6
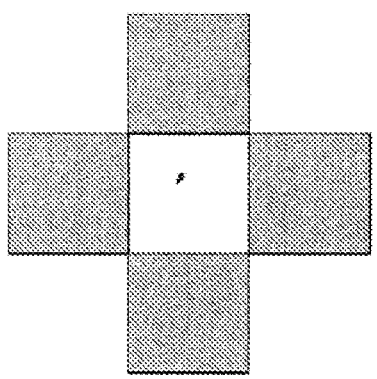 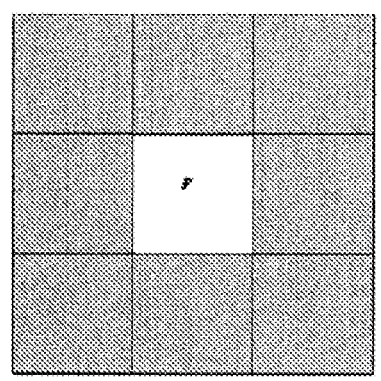
Fig. 7a          Fig. 7b

Fig. 8a  Fig. 8b

AUTOMATED TUBERCULOSIS SCREENING

CROSS-REFERENCE TO RELATED APPLICATIONS

The present application is a U.S. national stage application under 35 U.S.C. 371 of International Application No. PCT/IB2010/056049, filed on Dec. 23, 2010, the entire contents of which are incorporated herein by reference in its entirety. International Application No. PCT/IB2010/056049 claims the benefit of Indian Application No. 3324/CHE/2010 filed on Nov. 8, 2010 under 35 U.S.C. 119(a).

BACKGROUND

The following description is provided to assist the understanding of the reader. None of the information provided or references cited is admitted to be prior art.

Tuberculosis (TB) is a serious illness that results in morbidity and mortality, if neglected. In fact, the World Health Organization has declared TB a global health emergency. TB often afflicts the poorer and malnourished segments of society. Due to the infectious nature of TB, early diagnosis is critical in controlling the disease and in reducing the trauma and cost to the patient. In the most common form of TB, pulmonary TB, active infection is diagnosed by examining the stained sputum smears of subjects by well-trained technicians. The technician looks for the presence of mycobacteria in the sputum smear; the bacilli-count is an indicator of the degree of infection.

In practice, there are two methods of staining/microscopy. The faster and more sensitive approach involves screening the sputum samples stained with auramine or rhodamine using a fluorescence microscope. However, this method is very expensive. A much cheaper method involves visually examining highly-magnified microscopic fields of Ziehl-Neelsen (ZN) stained sputum smears. Although this method is commonly practiced, it may not provide accurate results because only a few sub-regions may be examined (leading to possible omission of diagnostically important sub-regions) because it is tedious to check a large number of images. As a result, the average count of the bacilli is approximate possibly causing disease to go undiagnosed or require subsequent visits/tests. Further, the severity of the disease and its prognosis may be misestimated based on the grading of sputum smears.

SUMMARY

In an aspect, a method of determining a number of mycobacteria in source image data of a sputum-smear sample is provided. First image data is extracted from the source image data. Binary image data is created from the extracted image data. A plurality of groups of blobs is identified in the created binary image data. A distance between a pair of the identified plurality of groups of blobs is determined. If the distance is below a threshold value, the pair is combined into a single group of blobs. The determining is repeated for pairs of the identified plurality of groups of blobs. A classification of the plurality of groups of blobs is determined. In one illustrative embodiment groups of blobs are classified as a single bacillus, a beaded bacillus, or a clump of bacilli.

In another aspect, a computer-readable medium is provided having stored thereon computer-readable instructions that when executed by a computing device cause the computing device to perform the method of determining a number of mycobacteria in image data of a sputum-smear sample.

In yet another aspect, a device is provided. The device includes, but is not limited to, a processor and the computer-readable medium operably coupled to the processor. The computer-readable medium has instructions stored thereon that when executed by the processor cause the system to perform the method of classifying blobs in image data of a sputum-smear sample.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 6 is a plot showing a comparison between a manual bacilli count and an illustrative embodiment's automatic determinations (using the TB screening system of FIG. 1) of a number of mycobacteria in each of 20 images.

FIG. 7a is a graph illustrating a four pixel neighborhood of pixel p.

FIG. 7b is a graph illustrating an eight pixel neighborhood of pixel p.

FIG. 8a is graph illustrating three blobs.

FIG. 8b is a graph illustrating the results of connected-component labeling based on an 8-neighborhood the three objects of FIG. 8a.

DETAILED DESCRIPTION

Figure 1:
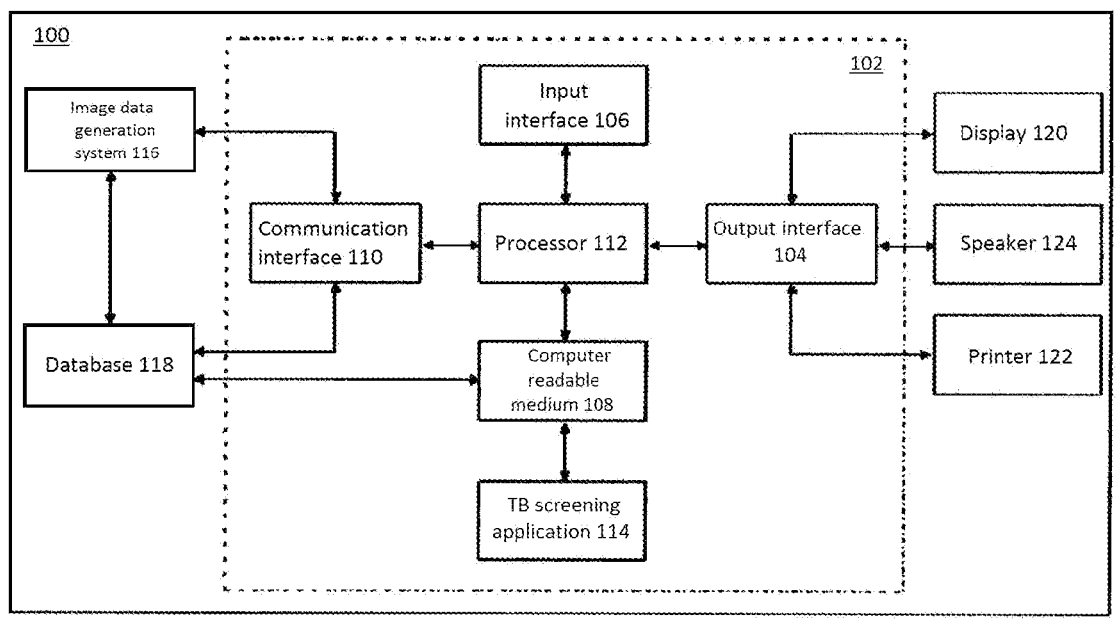
FIG. 1 depicts a block diagram of an illustrative embodiment of a TB screening system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

A method of determining a number of mycobacteria in image data of a sputum-smear sample is provided. In an illustrative embodiment, image data is extracted from image data of the sputum-smear sample. Binary image data is created from the extracted image data. A plurality of groups of blobs is identified in the created binary image data. Groups of blobs whose size are less than a predetermined amount constitute noise and are removed the plurality of blobs. A representative example of the predetermined size is 30 pixels. Other sizes, however, can be used such as 15 or 45 pixels. A distance between a pair of the identified plurality of groups of blobs is determined. If the distance is below a threshold value, the pair is combined as a single group of blobs replaces the pair of groups of blobs in the plurality of blobs. The determining is repeated for pairs of the identified plurality of groups of blobs. The plurality of groups of blobs remaining may be classified as individual bacillus, beaded bacillus, or a clump of bacilli.

With reference to FIG. 1, an illustrative embodiment of a block diagram of a TB screening system 100 is shown. TB screening system 100 may include one or more of an image data generation system 116, a database 118, a computing device 102, a display 120, a printer 122, and a speaker 124. Different and additional components may be incorporated into TB screening system 100. Computing device 102 may include one or more of an output interface 104, an input interface 106, a computer-readable medium 108, a communication interface 110, a processor 112, and a TB screening application 114. Computing device 102 may be a computer of any form factor. Different and additional components may be incorporated into computing device 102. Display 120, printer 122, and speaker 124 are illustrative output devices for use with computing device 102.

Image data generation system 116 generates image data of sputum-smear samples. The source of and the dimensionality of the image data are not intended to be limiting. In an illustrative embodiment, the source of the image data is a highly magnified microscope and the sputum-smear samples are stained by a Ziehl-Neelsen (ZN) procedure. Image data generation system 116 may provide the image data to computing device 102 directly through communication interface 110 or may provide the image data to computing device 102 in the form of a memory media such as a compact disk (CD), digital versatile disk (DVD), etc.

As another option, image data generation system 116 may store the image data in database 118 in a cloud, on the web, etc. Database 118 may include any type of storage architecture. Storage architectures include files in a file system, native XML databases, relational databases, SQL databases, etc. Database 118 may comprise a file system including a plurality of data files. Database 118 may be accessed from computing device 102 using communication interface 110.

Output interface 104 provides an interface for outputting information for review by a user of TB screening system 100 or for inputting information to another system for analysis of the output of TB screening system 100, for example as a data stream. For illustration, output interface 104 may include an interface to display 120, printer 122, speaker 124, etc. Display 120 may be one or more of a thin film transistor (TFT) display, a light emitting diode (LED) display, a liquid crystal display (LCD), or any of a variety of different displays known to those skilled in the art. Printer 122 may be any of a variety of printers as known to those skilled in the art. Speaker 124 may be any of a variety of speakers as known to those skilled in the art. Computing device 102 may have one or more output interfaces that use the same or a different interface technology. Display 120 and/or printer 122 further may be accessible to computing device 102 through communication interface 110.

Input interface 106 provides an interface for receiving information for entry into computing device 102 as known to those skilled in the art. Input interface 106 may use various input technologies including, but not limited to, a keyboard, a pen and touch screen, a mouse, a track ball, a touch screen, a keypad, one or more buttons, etc. to allow the user to enter information into computing device 102 or to make selections presented in a user interface displayed on display 120. Input interface 106 may provide both an input and an output interface. For illustration, a touch screen both allows user input and presents output to the user. Computing device 102 may have one or more input interfaces that use the same or a different input interface technology.

Computer-readable medium 108 is an electronic holding place or storage for information so that the information can be accessed by processor 112 as known to those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., CD, DVD, . . . ), smart cards, flash memory devices, etc. Computing device 102 may have one or more computer-readable media that use the same or a different memory media technology. Computing device 102 also may have one or more drives that support the loading of a memory medium such as a CD or DVD. Computer-readable medium 108 may comprise a cache in which data can be stored temporarily for rapid access by processor 112. Computer-readable medium 108 further may comprise database 118.

Communication interface 110 provides an interface for receiving and transmitting data between devices using various protocols, transmission technologies, and media as known to those skilled in the art. The communication interface may support communication using various transmission media that may be wired or wireless. Computing device 102 may have one or more communication interfaces that use the same or a different communication interface technology. Data may be transferred between computing device 102 and image data generation system 116 using communication interface 110. Additionally, communication interface 110 may provide connectivity to other systems. For illustration, communication interface 110 may provide connectivity to database 118.

Processor 112 executes instructions as known to those skilled in the art. The instructions may be carried out by a special purpose computer, logic circuits, or hardware circuits. Thus, processor 112 may be implemented in hardware, firmware, or any combination of these methods. The term "execution" is the process of running an application or the carrying out of the operation called for by an instruction. The instructions may be written using one or more programming language, scripting language, assembly language, etc. Processor 112 executes an instruction, meaning that it performs the operations called for by that instruction. Processor 112 operably couples with one or more of output interface 104, input interface 106, computer-readable medium 108, and communication interface 110, among others, to receive, to send, and to process information. Processor 112 may retrieve a set of instructions from a permanent memory device and copy the instructions in an executable form to a temporary memory device that is generally some form of RAM. Computing device 102 may include a plurality of processors that use the same or a different processing technology.

TB screening application 114 performs operations associated with processing image data that potentially contains magnified bacteria. As an illustrative example, sputum-smear samples stained by a ZN procedure and obtained using a highly magnified microscope may comprise the image data. Alternatively, image data may be images taken from a fluorescent microscope of auramine-O stained sputum-smear samples. TB screening application 114 further may output a determination of a number of mycobacteria in the image data. The determination of a number of mycobacteria in the image data may comprise the number of individual bacilli, the number of clumps, or the number of beaded bacilli present in the image data. Some or all of the operations described may be embodied in TB screening application 114. The operations may be implemented using hardware, firmware, software, or any combination of these methods. With reference to the illustrative embodiment of FIG. 1, TB screening application 114 is implemented in software stored in computer-readable medium 108 and accessible by processor 112 for execution of the instructions that embody the operations of image TB screening application 114. TB screening application 114 may be written using one or more programming languages, assembly languages, scripting languages, etc. TB screening application 114 may be implemented as a plug-in to a data processing and visualization application.

Components of TB screening system 100 may be housed in a single device, positioned in a single location, a single facility, and/or may be remote from one another. Thus, image data generation system 116, database 118, and/or computing device 102 may be integrated into a single system. Image data generation system 116, database 118, and/or computing device 102 may be connected directly through a wired or wireless technology. For illustration, image data generation system 116 may connect to computing device 102 using a cable for transmitting information between image data generation system 116 and computing device 102. Image data generation system 116 may connect to computing device 102 using a network. Image data may be stored electronically and accessed using computing device 102. Image data generation system 116 and computing device 102 do not need to be connected. Instead, the data acquired using image data generation system 116 may be manually provided to computing device 102. For illustration, the data may be stored on electronic media such as a CD, a DVD, a flash drive, etc. After receiving the data, computing device 102 may initiate processing of the data automatically or under control of an operator of computing device 102.

Figure 2:
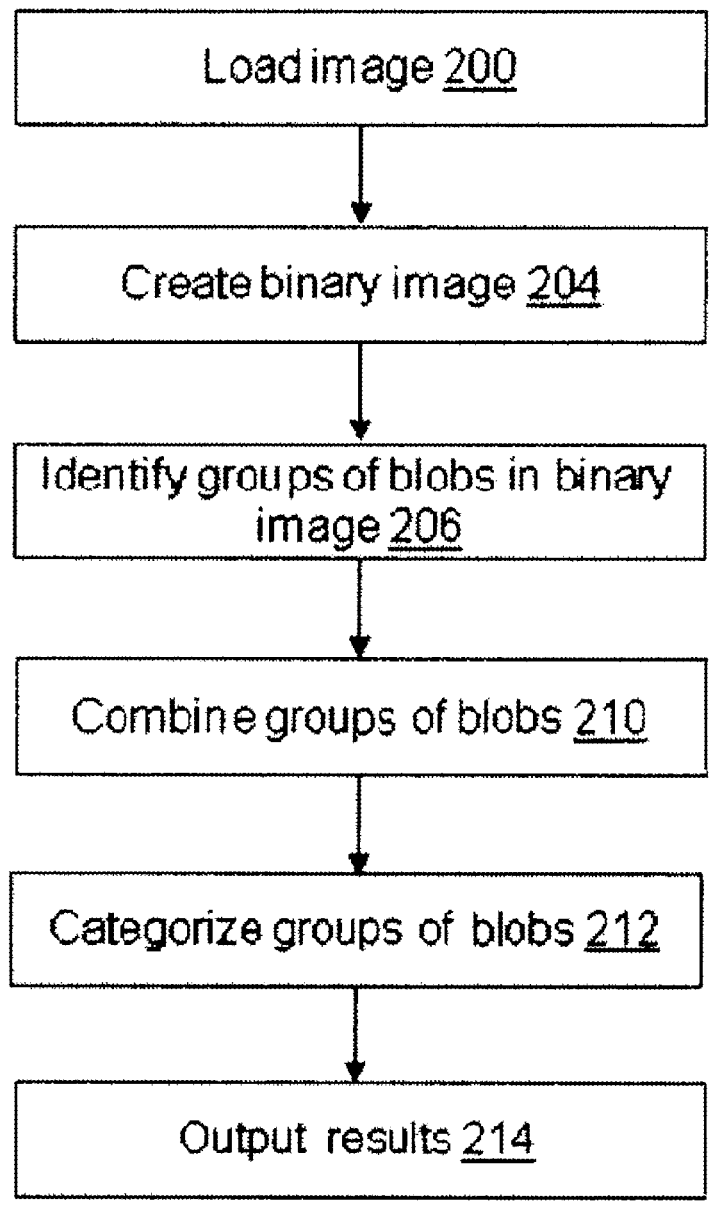
FIG. 2 depicts a flow diagram of an illustrative embodiment of operations performed by the TB screening system of FIG. 1.

With reference to FIG. 2, an illustrative embodiment of operations associated with TB screening application 114 of FIG. 1 is described. Additional, fewer, or different operations may be performed, depending on the embodiment. In addition, although some of the operational flows are presented in sequence, the various operations may be performed in various repetitions, concurrently, and/or in other orders than those that are illustrated. The order of presentation of the operations of FIG. 2 is not intended to be limiting. In an operation 200, image data is input or received by TB screening application 114 for processing by TB screening application 114. For illustration, the image data may be stored at computing device 102 and selected for input to TB screening application 114 using an interactive dialog box that allows a user to select the data source as well as the loading mechanism associated with the data source. As alternatives, the image data may be streamed to computing device 102 from image data generation system 116 or the image data may be received by computing device 102 from database 118. As another alternative, image data may be received by computer device 102 from an external source, such as the internet.

The pixels associated with the bacterial region and those associated with the rest of the background are fairly distinct in the hue, saturation and intensity (HSI) space. The HSI model also is close to the way humans (and hence the operators who work with images of the sputum smear) perceive color. As the HSI model is not a shape-based model, HSI is not restrictive to identifying only bacilli of a specific shape. Accordingly, the HSI model is able to identify "Y," "T," and "V" shaped bacilli. In addition, the HSI model is able to identify bacilli with beaded appearance, which are very common and very specific to TB. In the HSI model, hue and saturation carry color information, while intensity is independent of hue and saturation and does not carry color information. Hue describes pure color and saturation refers to the "degree of dilution from purity" by white light. Intensity is similar to that associated with gray-level pictures, and is decoupled from the color-information, which is embedded in hue and saturation. Since color-images from the microscope are available in the red, green, blue (RGB)-format, the HSI parameters may be extracted using the following transformations:

$$H = \begin{cases} \theta, & B \leq G \\ 360 - \theta, & B > G \end{cases} \text{ where}$$

$$\theta = \cos^{-1}\left\{\frac{\frac{1}{2}[(R-G)+(R-B)]}{\sqrt{(R-G)^2 + (R-B)(G-B)}}\right\},$$

$$S = 1 - \frac{3}{(R+G+B)}\text{Min}\{R, G, B\}, \quad I = \frac{1}{3}(R+G+B),$$

and where R, G, and B are red, green, and blue pixel values, respectively.

In an operation 204, a binary image is created. For illustration, the binary image is created by segmenting the candidate bacterial regions based on color. Image creation may also include mapping the pixels from the RGB color space to the HSI space to generate information corresponding to the pixels, and using the generated information to classify the pixels into the class of bacteria or the background. Specifically, pixels belonging to bacteria and pixels from the background of multiple images of ZN-stained sputum smears are mapped into the HSI space. These pixels form clusters in the HSI space, representing the information regarding the color content associated with the bacteria and the background, respectively, in the color space.

Once the color information is obtained, segmentation between the background and the bacteria may be achieved using a minimum distance rule. Specifically, a pixel is considered to belong to the bacterial region if it is closer to the cluster associated with the bacterial region in the HSI space. The Mahalanobis distance, $d^2(x,\mu_i)=(x-\mu_i)C_i^{-1}(x-\mu_i)$, where $C_i$ is the covariance matrix and $\mu_i$ is the mean, respectively, associated with the cluster indexed by i (i=1,2) may be used to make this determination, and x is the data vector consisting of the H,S, and I values of a pixel that is to be classified. In an illustrative embodiment, the covariance matrix can be used to represent the contours of constant density (3D histogram) as hyperellipsoids of constant Mahalanobis distance from $\mu_i$.

Alternative distance and classification schemes may also be employed. For example, a rotated coordinate system method can be used to segment the pixels associated with the bacteria and the background in the color space. The distance between a vector x and the cluster i in the HSI space, according to the rotated coordinate method is given by $$d(x, q^{(i)}) = (\lambda_{i,1}\lambda_{i,2}\lambda_{i,3})^{\frac{1}{3}} \left\{ \sum_{k=1}^{3} \frac{[(x-\mu_i)^T c_{i,k}]^2}{\lambda_{i,k}} + 3 \right\}.$$

In this expression, $q^{(i)}$ is the cluster, $\{c_{i,k}, k=1,2,3\}$ and $\{\lambda_{i,k}, k=1,2,3\}$ are the eigenvectors and the eigenvalues associated with the covariance matrix associated with cluster "i," $\mu_i$ is the mean, respectively, associated with the cluster indexed by i (i=1,2) may be used to make this determination, and x is the data vector consisting of the H, S, and I values of a pixel that is to be classified.

The clusters associated with the bacteria and the background, although fairly distinct, may exhibit a small overlap. In some cases, the overlap is due to the similarity in the colors associated with the bacteria and some regions of epithelial cells. Such an overlap can result in an incorrect classification, and consequently some errors in segmentation. Although such a similarity may not occur often, the effects can be reduced by an optional operation of dividing/splitting a large cluster associated with the background into several smaller sub-clusters so that segmentation of pixels associated with mycobacteria (i.e., of correct classification) becomes more robust based on the fact that the expression for Mahalanobis distance involves distance from the mean, apart from the inverse of the covariance. As an example, a set of points associated with bluish epithelial cells may be considered as a separate cluster with a spread that could potentially interfere with segmentation of the bacterial cluster. However, any point that is truly epithelial cell in an overlapping region will occur close to the mean associated with the epithelial cluster and far from the mean associated with the bacterial cluster (whose spread is relatively higher). Application of this method can improve the robustness of the segmentation. For example, dividing the large cluster associated with the background into several smaller sub-clusters significantly improves the accuracy of counting of beaded bacilli and clumps of bacilli. The preceding example is only illustrative and not meant to be limiting.

In an operation 206, groups of blobs are identified in the binary image. Initially, each group of blobs contains a single blob. A blob can refer to a set of pixels connected according to a predetermined criterion. An illustrative criterion involves adjacency of pixels depending on whether a neighborhood used to define adjacency is the 4-points or the 8-points which surround each pixel. Thus, a set of pixels is 8-connected if there exists an 8-connected path between them such that the binary value is the same. A group of connected pixels identified using 4-point or 8-point adjacency thus defines a blob.

FIG. 7a is a graph illustrating a four pixel neighborhood of pixel p. FIG. 7b is a graph illustrating an eight pixel neighborhood of pixel p. The neighborhood of the pixel in both FIG. 7a and FIG. 7b is represented by the darker regions. In FIG. 7a, there are four pixels in the neighborhood of p. In FIG. 7b, the neighborhood of pixel p is expanded to include eight pixels. A pixel is considered adjacent to a second pixel if it is located within the neighborhood of the second pixel. When two pixels are adjacent using the 8-point adjacency, the pixels may be referred to as 8-point adjacent. Further, a set of pixels are said to be an 8-connected path if $p_k$ is adjacent to $p_{k+1}$, for $k \in [1,n)$. In a binary image, the set of all non-zero pixels (also called "foreground pixels") that are 8-connected to a pixel p (i.e. such that an 8-connected path exists among all of them) is called a connected component containing pixel p. The connected component may also be called an object or blob.

Figures 8A, 8B:
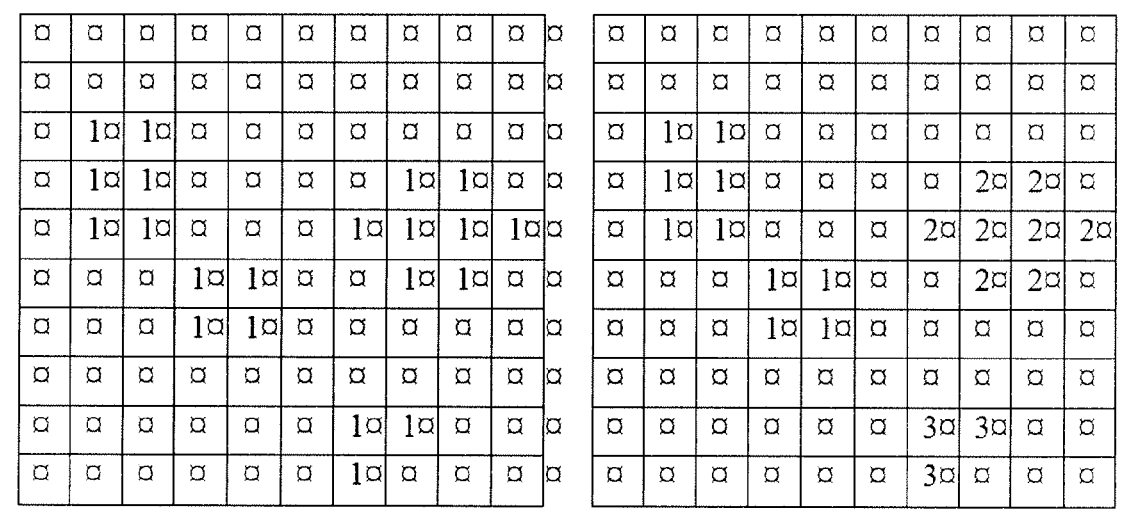

In an illustrative embodiment, each identified blob is labeled. FIG. 8a is a graph illustrating three unlabeled blobs. Labeling is achieved by scanning a binary picture pixel-by-pixel, tracking neighbors and adjacency of each of the pixels, and labeling the set of all distinct connected components. FIG. 8b illustrates a graph that has segmented the three blobs and labeling each blob.

Alternatively, mixed adjacency may also be used to identify blobs. Using mixed adjacency, a pixel p is adjacent to a pixel q if q is in either the four pixel neighborhood of p or in the diagonal neighborhood of p and $N_4(p) \cap N_4(q)$ is null.

Figure 5:
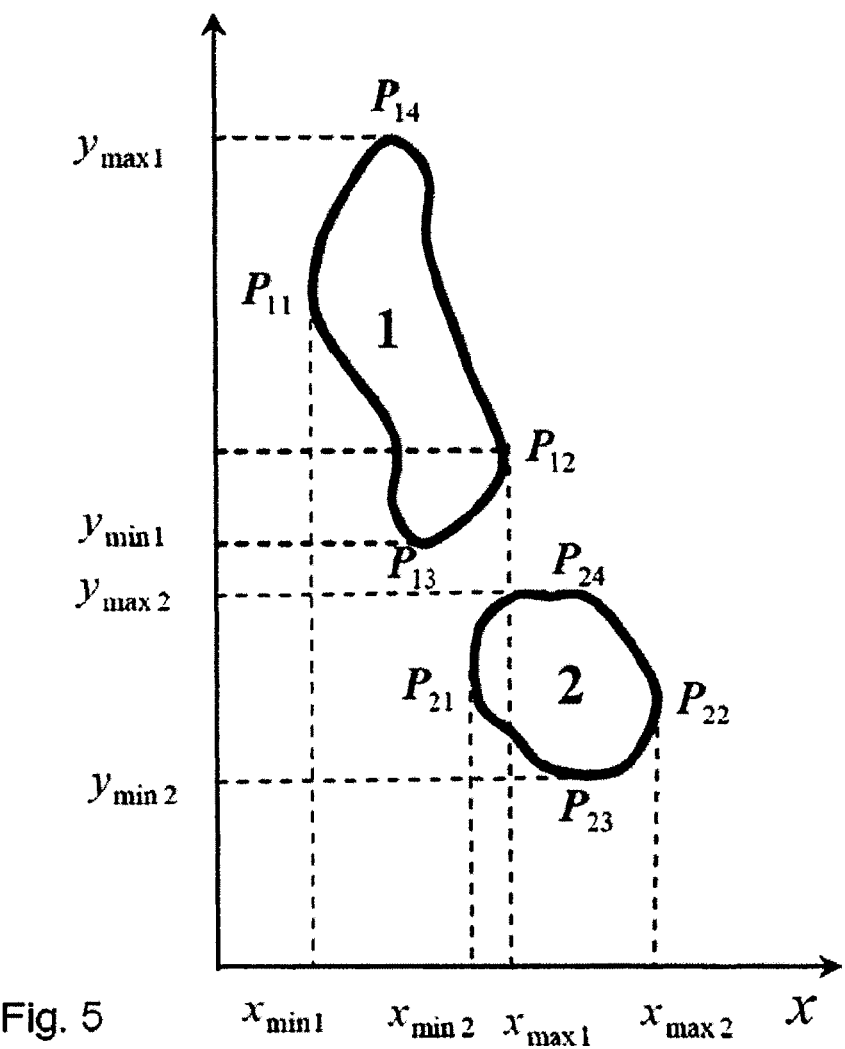
FIG. 5 is a plot of an illustrative embodiment of a proximity test applied as part of the operations performed by the TB screening system of FIG. 1.

In an operation 210, a distance between pairs of groups of blobs is calculated and groups of blobs in close proximity are combined into a single group. In an illustrative embodiment, a pair of groups of blobs that are close in proximity are grouped as components of an indexed-array of blobs. Each element of the indexed-array contains a reference to each blob that comprises the group. For illustration, the distance can be calculated based on the extreme X- and Y-coordinates associated with each pair of groups of blobs. Thus, for each pair of groups of blobs in the binary image, the following operations may be performed. With reference to FIG. 5, the coordinates of the extreme-points associated with a first group of blobs are obtained as $P_{11} \equiv (x_{min1}, y_{11})$, $P_{12} \equiv (x_{max1}, y_{12})$, where $y_{11}$ and $y_{12}$ are the y-coordinates of $P_{11}$ and $P_{12}$, respectively and where $x_{min1}$ is the minimum x-coordinate of the first group of blobs and $x_{max1}$ is the maximum x-coordinate of the first group of blobs. Similarly, $P_{13} \equiv (x_{13}, y_{min1})$, $P_{14} \equiv (x_{14}, y_{max1})$, where $x_{13}$ and $y_{14}$ are the y-coordinates of $P_{13}$ and $P_{14}$, respectively and where $y_{min1}$ is the minimum y-coordinate of the first group of blobs and $y_{max1}$ is the maximum y-coordinate of the first group of blobs. Additionally, the coordinates of the extreme-points associated with a second group of blobs are obtained as $P_{21} \equiv (x_{min2}, y_{21})$, $P_{22} \equiv (x_{max2}, y_{22})$ and $P_{23} \equiv (x_{23}, y_{min2})$, $P_{14} \equiv (x_{24}, y_{max2})$, where $x_{min2}$, $x_{max2}$, $y_{min2}$, and $y_{max1}$ are the extreme coordinates of the second group of blobs. The distance between each of the extreme points associated with the first group of blobs and those associated with the second group of blobs is calculated resulting in 16 distance values. In alternative embodiments, fewer or additional distance values may be calculated and used. The minimum distance of the 16 determined values is calculated. If the minimum distance is less than a pre-defined value, the two groups of blobs are combined or grouped together. In one embodiment, the pre-defined value can be a distance of 15 pixels. In alternative embodiments, a shorter or longer distance may be used.

In an operation 212, the groups of blobs are categorized into individual/unbeaded bacillus, beaded bacillus, and clumps of bacilli. If a group of blobs has more than a pre-defined number of blobs, the group of blobs may be classified as a clump. In an illustrative embodiment, the predefined number is 5. Other values such as 3, 7, or 10 may also be used to classify a group of blobs as a clump. If the group of blobs contains a single blob, classification of the group of blobs as either an individual/unbeaded bacillus or a clump is based upon a size of the single blob. The size of a blob, for example, may be calculated by counting the number of pixels contained within the blob. If the size of the blob is within a first size range, the blob is classified as an individual/unbeaded bacillus. If the size of the blob is within a third size range, the blob is classified as a clump. If the size of the blob is not within the first or third size range, the blob is classified as noise. For groups of blobs that contain more than one blob, but less than the number of predefined blobs, the size of the group of blobs is used to classify the blobs. In an illustrative example, the size of a group of blobs is the sum of the size of each blob within the group. The size of a blob, for example, may be calculated by counting the number of pixels contained within the blob. If the size of the group of blobs is within a second size range, the group is classified as a beaded bacillus. If the size of the group of blobs is within a third size range, the group of blobs is classified as a clump. If the size of the group of blobs is not within the second or third size range, the group of blobs is classified as noise.

Various size ranges can be used to determine the category of each group of blobs. As an illustrative example, the first size range is used to classify a blob as a single bacillus. The second size range is used to classify each group of blobs as a beaded bacillus. A third size range is used to classify a group of blobs as a clump of bacilli. Blobs that are not within these size ranges may be classified as a noisy object. The values of the first, second, and third size ranges are predetermined and may be defined by a user of TB screening system 100 using an interactive dialog box that allows a user to enter the values or select from optional values. In another illustrative embodiment, the first, second, and third size threshold values are determined based on characteristics of the image data or based on historical data. For illustration, based upon empirical results, the first size range can be set to a range of between 150 and 900 pixels, inclusive. The second size range can be set to between 400 and 900 pixels, inclusive. The third range can be set to be between 901 and some large value, for detecting the presence of clumps.

The size ranges discussed above are for illustrative purposes. A larger number of size ranges may be used to further classification of bacilli. In addition, the ranges themselves may be changed to accommodate the classification of bacilli.

In an operation 214, the identified number of bacillus, the number of beaded mycobacteria and the number of clumps of mycobacteria based upon the image data are output. For example, the number of various bacilli found in the image data can be printed to printer 122, presented on display 120, output via computerized voice via speaker 124, or stored to computer-readable medium 108 and/or database 118. Additionally, the binary image showing the remaining blobs may be output possibly in combination with the image data to show a comparison between the two images. The size of each group of blobs may also be output, as the size of each group of blobs may be useful in determining the severity of the disease.

Figure 3:
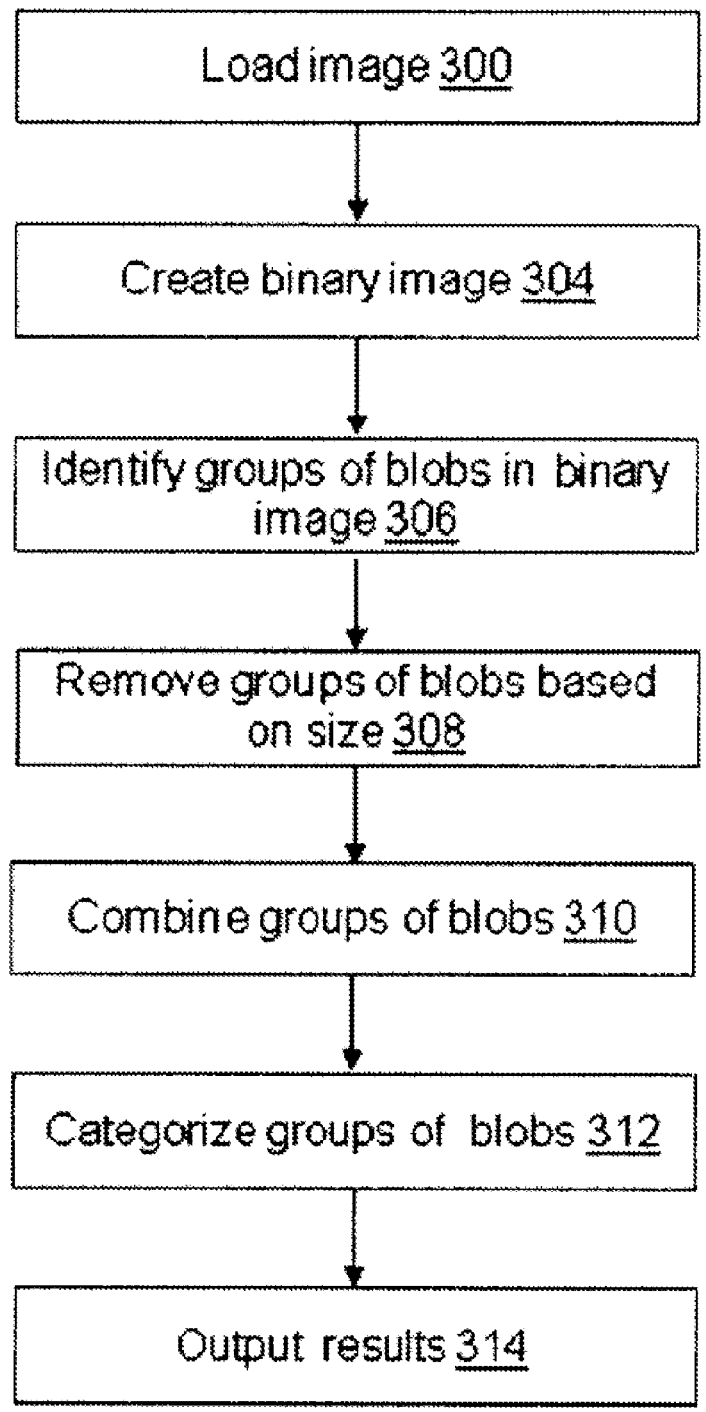
FIG. 3 depicts a flow diagram of another illustrative embodiment of operations performed by the TB screening system of FIG. 1.

With reference to FIG. 3, another illustrative embodiment of operations associated with TB screening application 114 of FIG. 1 is described. Additional, fewer, or different operations may be performed, depending on the embodiment. In addition, although some of the operational flows are presented in sequence, the various operations may be performed in various repetitions, concurrently, and/or in other orders than those that are illustrated. The order of presentation of the operations of FIG. 3 is not intended to be limiting. A number of operations in FIG. 3 are similar to the operations illustrated in FIG. 2. For instance, image data is loaded in an operation 300 in the same way image data is loaded in operation 200 of FIG. 2. A binary image is created in an operation 304 and groups of blobs are identified in an operation 306. Both operations are similar to operations 204 and 206 of FIG. 2, respectively. In an operation 308, the size of each group of blobs is determined. Groups of blobs that are smaller than a predetermined size are discarded. In an illustrative embodiment, groups of blobs that are less than 30 pixels in size are discarded. Alternatively, a different threshold such as 10 pixels, 15 pixels, 25 pixels, 40 pixels, etc. may be used.

In an operation 310, the distance between each pair of remaining groups of blobs is determined. The distance between groups of blobs is calculated in a similar manner as described in operation 210 of FIG. 2. Each group of blobs in the array is categorized in an operation 312 in a similar manner as described in operation 212 of FIG. 2. In an operation 314, the number of individual/unbeaded bacillus, beaded bacillus, and clumps of bacilli are output in a similar manner as described in relation to operation 214 of FIG. 2.

With reference to FIG. 6, a plot 600 showing an assessment of the degree of TB-infection, in terms of number of mycobacteria (AFB count) in each of 21 images is shown. The 21 images are the first 21 images from a set of 169 samples. The remaining 144 images showed similar results to those of the first 21. Results of a solid curve 602 corresponds to a manual visual count of the number of mycobacteria performed by a doctor and is assumed to represent the actual value. A second curve 604 represents a count of the number of mycobacteria provided using the HSI space method and includes the optional operation of segmenting the larger cluster into smaller sub-clusters to create the binary image.

Including the optional operation of segmenting the larger cluster into smaller sub-clusters to create the binary image improves the accuracy of the method compared to not splitting the background. For instance, empirical results show improvements in performance in classifying individual bacillus, beaded bacillus, and clumps. Table 1 below shows the improvement in the percent of successful detections based upon the 169 samples discussed above.

| Background | Individual *bacillus* (either unbeaded or beaded *bacillus*) | Beaded *bacillus* | Clumps |
| --- | --- | --- | --- |
| Split | 93.49% | 83.60% | 82.44% |
| Unsplit | 87.57% | 53.55% | 51.15% |

The method based on using the classification in the HSI space method described above and splitting the large cluster into smaller sub-clusters to create the binary image is shown to work well. Even small numbers of bacteria have been counted fairly well. For example, this approach was accurate in counting the small number of bacteria as illustrated by the results corresponding to images 4, 5, 8, and 13 of FIG. 6. Additionally, this method is believed to work equally well in the RGB space.

In obtaining the results, 169 images of ZN-stained sputum smears, taken by a Leica DFC 320 at a magnification of 1000× (exposure time=1.62 milliseconds with no auto-exposure, gain=1.4×, color saturation=1.55×, γ=0.54; black=14, white=49, brightness=44%, automatic white balance=on, and auto shadow correction=40×) were considered for analysis based on the procedures discussed above. Using the classification in the HSI space method described above and splitting the large cluster into smaller sub-clusters, a background cluster was split into two sub-clusters. The sub-clusters were built from pixels taken from the following specific regions: (i) epithelial cells and (ii) the rest of the background. The sub-clusters were used to create binary images of each of the 169 images. As using the sub-clusters is optional, binary images were also created using the unsegmented background cluster.

The binary images were then subject to post-processing as described in operations 206, 210, and 212. Groups of blobs having a size less than 150 pixels were discarded. Groups of blobs having a size between 150 and 900 pixels and containing a single blob were classified as a single bacillus. Each group of blobs having a size between 400 and 900 pixels and containing more than a single blob were classified as beaded bacillus. Groups of blobs having a size greater than 900 pixels were classified as clumps of bacilli. Connected component labeling, used to segment and label the blobs, was achieved through the program "bwlabel" in MATLAB. In alternative embodiments, any other program or method known to those of skill in the art may be used.

Figure 4:
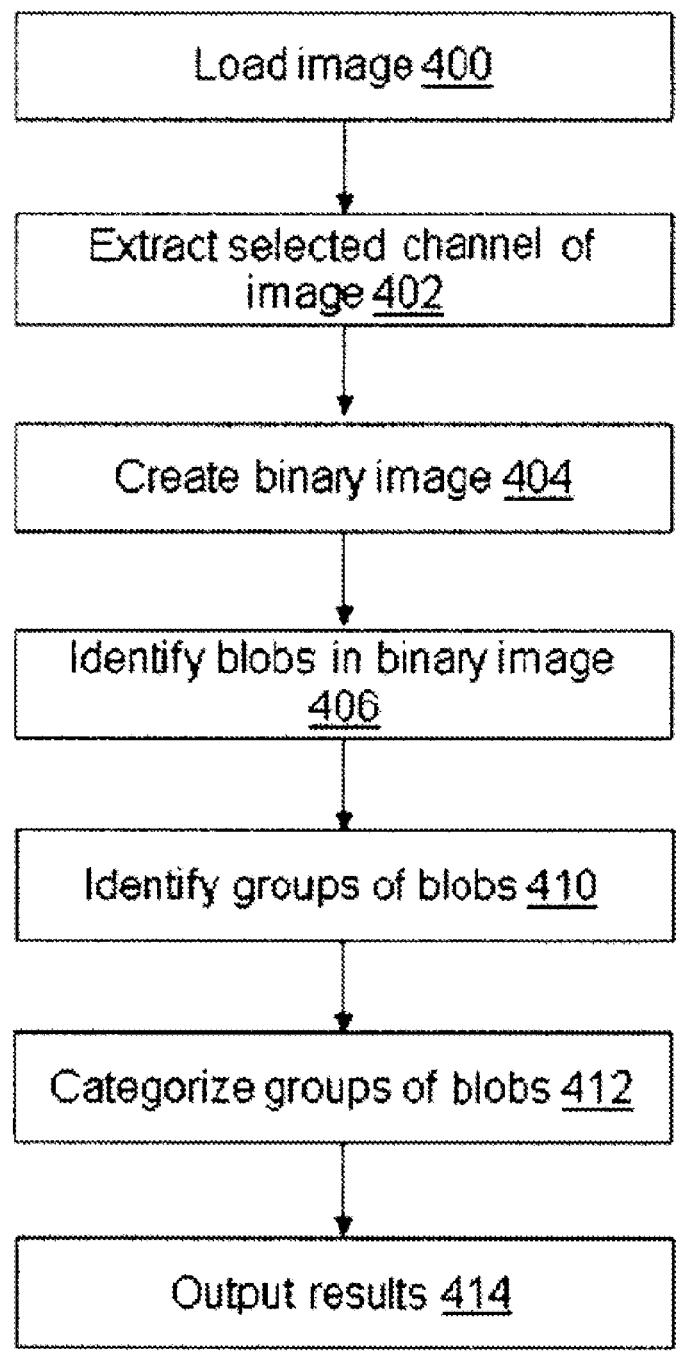
FIG. 4 depicts a flow diagram of another illustrative embodiment of operations performed by the TB screening system of FIG. 1.

Another illustrative embodiment of operations associated with TB screening application 114 of FIG. 1 is disclosed with respect to FIG. 4. Image data is loaded in an operation 400. In an operation 402, a selected channel of information is extracted from the image data. The selection of the channel may be based on a detailed visual examination of image data that reveals a significant color-component in the background—including the pus and epithelial cells—while the bacteria has very little or no occurrence of that color-component, and thus appears dark in the image. For illustration, a green channel may be selected based on the ability of the green channel to distinguish the mycobacteria from the other material in the sample due to the non-occurrence of the color associated with the mycobacteria and the contrast provided using the color.

In an operation 404, a binary image is created. For illustration, an optimum threshold can be determined based on certain criteria and using a maximum entropy principle based on a two-dimensional (2D) histogram derived from the extracted image data and a blurred version of the extracted image data. The 2D histogram can be determined using the gray values of the pixels of the image data and a respective local average. For illustration, if f(m,n) is the extracted image of size M×N, its averaged version can be defined as $$g(m, n) = \frac{1}{9} \sum_{i=-1}^{1} \sum_{j=-1}^{1} f(m + i, n + j),$$

and the 2D histogram can be defined as h(k,l)=P{f(m,n)=k,g(m,n)=l}. The probability density function i.e., the normalized 2D histogram, can be estimated as $$p(k, l) = \frac{1}{MN} \times (\text{\# Pixels: } f(m, n) = k, g(m, n) = l).$$

A pair of thresholds t for f(m,n) and s for g(m,n) is determined. The thresholds are in form of coordinates of a point in the 2D histogram space. When these coordinates point to an optimal location, the sum of the entropies is maximized. The vector $[t,s]^T$ divides the 2D density into four quadrants. By construction, quadrant Q2, defined by [0,t] and [0,s], corresponds to the background, while quadrant Q4 defined by [t+1,M] [s+1,L], where L represents the number of gray levels in the image, corresponds to the object. Thus, the distributions over Q2 and Q4 are considered independent. The entropy associated with the background can be defined as $$H_B^a = \frac{1}{1-a} \ln \sum_{i=0}^{t} \sum_{j=0}^{s} \frac{p(i, j)}{P_2(t, s)}$$

where $P_2(t,s)$ is the cumulative probability. Where p(i,j) is the same as the previously discussed p(k,l). Similarly, the entropy associated with the object can be defined as $$H_o^a = \frac{1}{1-a} \ln \sum_{i=0}^{t} \sum_{j=0}^{s} \frac{p(i, j)}{P_4(t, s)}.$$

Because the other two quadrants, Q1 and Q3, correspond to object and noise, they are neglected. Therefore, $P_4(t,s)=1-P_2(t,s)$.

The object and the background, corresponding to the two peaks in the normalized histogram, can be separated by selecting the vector $[t^*,s^*]^T$ that maximizes the sum of entropies $$[t^*, s^*]^T = \text{Arg} \frac{\max}{(t, s)} [H_B^a(t, s) + H_0^a(t, s)]$$

where the value of the parameter a should be between 0 and 1. Values around 0.5 are known to work well, though alternate values are possible, and may be determined by testing using a family of images. For example, a value of 0.7 may be used. In an illustrative embodiment, a "0" value in the binary image represents mycobacterium and a "1" value represents everything else, including the pus and epithelial cells.

Once the binary image is created, operations 406, 410, 412, and 414, which correspond to operations 206, 210, 212, and 214 of FIG. 2, are executed. Similarly, the operation of extracting a selected channel from an image 402 can be to create the binary image as disclosed in FIG. 3. Accordingly, operations 402 and 404 can be utilized to determine the number of beaded bacilli in an image.

Using the green channel method described above to create the binary image yielded very good results on sample test sets of images. Because this method resulted in over-estimates in spite of a good visual contrast in the image, it is likely that the count may be sensitive to simple methods such as thresholding. Further, the microscope settings may have affected the performance of the green-channel approach.

One or more flow diagrams may have been used herein. The use of flow diagrams is not meant to be limiting with respect to the order of operations performed. The herein-described subject matter sometimes illustrates different components contained within, or connected with, different other components. It is to be understood that such depicted architectures are merely illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of "operably couplable" include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense in which one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense in which one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A device comprising:
   a processor; and
   a computer-readable medium operably coupled to the processor, the computer-readable medium having instructions stored thereon that when executed by the processor cause the device to:
   extract hue-saturation-intensity (HSI) parameters from source image data based on red-green-blue (RGB) parameters of the source image data to create first image data, wherein the source image data represents a stained image;
   create binary image data from the first image data based at least in part on the HSI parameters;
   define a plurality of groups of blobs in the created binary image data;
   determine a distance between a pair of the defined plurality of groups of blobs, wherein the distance is calculated based on extreme X and Y coordinates associated with each pair of groups of blobs;
   if the distance is below a threshold value, combine the pair into a single group of blobs;
   repeat the determination and the combination for pairs of the defined plurality of groups of blobs; and
   classify the plurality of groups of blobs that rain.

2. A non-transitory computer-readable medium having stored thereon computer-readable instructions that when executed by a computing device cause the computing device to:
   extract hue-saturation-intensity (HSI) parameters from source image data based on red-green-blue (RGB) parameters of the source image data to create first image data herein the source image data represents a stained image;
   create binary image data from the first image data based at least in part on the HSI parameters;
   define a plurality of groups of blobs in the created binary image data;
   determine a distance between a pair of the defined plurality of groups of blobs, wherein the distance is calculated based on extreme X and Y coordinates associated with each pair of groups of blobs;
   if the distance is below a threshold value, combine the pair as a single group of blobs;
   repeat the determination and the combination for pairs of the defined plurality of groups of blobs; and
   classify the plurality of groups of blobs that remain.

3. A method to determine a number of mycobacteria in source image data of a sputum-smear sample, the method comprising:
   extracting, by a computing device, hue-saturation-intensity (HSI) parameters from the source image data based on red-green-blue (RGB) parameters of the source image data to create first image data, wherein the source image data represents a stained image;
   creating, by the computing device, binary image data from the first image data based at least in part on the HSI parameters;
   defining, by the computing device, a plurality of groups of blobs in the created binary image data;
   determining, by the computing device, a distance between a pair of the defined plurality of groups of blobs, wherein the distance is calculated based on extreme X and Y coordinates associated with each pair of groups of blobs;
   if the distance is below a threshold value, combining, by the computing device, the pair as a single group of blobs;
   repeating the determining and the combining, by the computing device, for pairs of the defined plurality of groups of blobs; and classifying, by the computing device, the plurality of groups of blobs that remain.

4. The method of claim 3, wherein defining the plurality of groups of blobs includes defining a first plurality of groups of blobs, the method further comprising defining a second plurality of groups of blobs by removing a blob from the first plurality of groups of blobs based on a size of the blob.

5. The method of claim 3, further comprising determining a size of each of the plurality of groups of blobs.

6. The method of claim 5, wherein the classifying of each group of blobs is based upon the size of the group of blobs.

7. The method of claim 6, wherein the classifying of each group of blobs comprises:
classifying the group of blobs as a single bacillus if the group of blobs contains a single blob and the size of the group of blobs is within a first size range;
classifying the group of blobs as a beaded bacillus if the group of blobs contains more than a single blob and the size of the group of bias is within a second size range; and
classifying the group of blobs as a clump if the size of the group of blobs is within a third size range.

8. The method of claim 4, wherein a group of blobs is removed from the plurality of groups of blobs if a size of the group of blobs is below a minimum threshold value.

9. The method of claim 3, wherein each blob of the plurality of blobs is classified into a single bacillus, a beaded bacilli, or a clump of bacilli.

10. The method of claim 3, wherein the source image data represents a sputum-smear sample stained by a Ziehl-Neelsen procedure.

11. The method of claim 3, wherein the first image data is created by mapping pixels in a red-green-blue space to a hue-saturation-intensity space.

12. The method of claim 11, wherein the binary image data is created by applying a minimum distance rule to classify pixels.

13. The method of claim 12, wherein the minimum distance rule is applied to a plurality of sub-clusters formed from a cluster associated with a background of the extracted first image data.

14. The method of claim 3, wherein the classifying comprises:
calculating a size of each of the plurality of groups of blobs;
classifying the group of blobs as a single bacillus if the group of blobs contains a single blob and the size of the group of blobs is within a first size range;
classifying the group of blobs as beaded bacillus if the group of blobs contains more than a single blob and the size of the group of blobs is within a second size range; and
classifying the group of blobs as a clump of bacilli if the size of the group of blobs is within a third size range.

15. The method of claim 3, wherein the extracted first image data is created based on a single color.

16. The method of claim 15, wherein the single color is green.

17. The method of claim 15, wherein the binary image data is created using a threshold determined based on a maximum entropy principle.

18. The method of claim 15, wherein the binary image data is created using a two-dimensional histogram derived from the extracted first image data and a blurred version of the extracted first image data.

19. The method of claim 18, wherein the blurred version of the extracted first image data is calculated as $$g(m, n) = \frac{1}{9} \sum_{i=-1}^{1} \sum_{j=-1}^{1} f(m+i, n+j)$$

where f(m,n) is the extracted first image data of size M×N.

20. The method of claim 19, wherein the two-dimensional histogram is a probability density function estimated as $$p(k, l) = \frac{1}{MN} \times (\# \text{ Pixels: } f(m, n) = k, g(m, n) = l).$$

21. The method of claim 20, wherein the binary image data is created by selecting $$[t^*, s^*]^T = \text{Arg} \frac{\max}{(t, s)} [H_B^a(t, s) + H_0^a(t, s)],$$

where $H_B^a(t, s) = \frac{1}{1-a} \ln \sum_{i=0}^{t} \sum_{j=0}^{s} \frac{p(i, j)}{P_2(t, s)}$ is an entropy associated with a background of the extracted first image data, $$H_o^a = \frac{1}{1-a} \ln \sum_{i=0}^{t} \sum_{j=0}^{s} \frac{p(i, j)}{P_4(t, s)}$$

is an entropy associated with an object of interest in the extracted first image data, $P_2(t,s)$ is a cumulative probability for the background, $P_4(t,s)=1-P_2(t,s)$ is a cumulative probability for the object of interest, a is a value selected between 0 and 1, and p(i,j) is a probability density function.

22. The method of claim 3, wherein defining the plurality of groups of blobs comprises identifying adjacency of pixels in a set of pixels in the binary image data.

23. The method of claim 22, wherein the adjacency includes four-point adjacency, eight-point adjacency, or mixed adjacency.

24. The method of claim 22, wherein defining the plurality of groups of blobs further comprises labeling each blob in the plurality of groups of blobs.

25. The method of claim 13, wherein forming the plurality of sub-clusters from the cluster involves dividing the cluster.

* * * * *

UNITED STATES PATENT AND TRADEMARK OFFICE
CERTIFICATE OF CORRECTION

| | | |
|---|---|---|
| PATENT NO. | : 9,196,047 B2 | Page 1 of 1 |
| APPLICATION NO. | : 13/375135 | |
| DATED | : November 24, 2015 | |
| INVENTOR(S) | : Galigekere et al. | |

It is certified that error appears in the above-identified patent and that said Letters Patent is hereby corrected as shown below:

In The Specification

In Column 1, Line 7, delete "under 35 U.S.C. 371" and insert -- under 35 U.S.C. § 371 --, therefor.

In Column 1, Line 12, delete "under 35 U.S.C. 119 (a)." and insert -- under 35 U.S.C. § 119(a). --, therefor.

In The Claims

In Column 14, Line 31, in Claim 2, delete "data herein" and insert -- data, wherein --, therefor.

In Column 15, Line 19, in Claim 7, delete "of bias" and insert -- of blobs --, therefor.

Signed and Sealed this
Eighth Day of March, 2016

Michelle K. Lee
*Director of the United States Patent and Trademark Office*